United States Patent [19]

Kawamoto et al.

[11] Patent Number: 4,767,129
[45] Date of Patent: Aug. 30, 1988

[54] ACTUATOR FOR STEERING THE REAR WHEELS IN FRONT AND REAR WHEEL STEERING DEVICE FOR VEHICLE

[75] Inventors: Yoshimichi Kawamoto; Yoshimi Furukawa; Tetsuro Hamada; Mitsuya Serizawa, all of Tochigi, Japan

[73] Assignee: Honda Giken Kogyo Kabushiki Kaisha, Tokyo, Japan

[21] Appl. No.: 821,998

[22] Filed: Jan. 24, 1986

[30] Foreign Application Priority Data

Jan. 24, 1985 [JP] Japan ................. 60-011832
Jan. 24, 1985 [JP] Japan ................. 60-011833

[51] Int. Cl.$^4$ ............................................. B62D 9/00
[52] U.S. Cl. ....................................... 280/91; 180/140
[58] Field of Search ........................... 280/91, 96, 99; 180/170, 172, 140, 141, 142, 143, 336; 74/571 L, 831, 834, 836

[56] References Cited

U.S. PATENT DOCUMENTS 4,105,086  8/1978  Ishii et al. ...................... 280/91
4,566,710  1/1986  Furakawa et al. .............. 280/91

FOREIGN PATENT DOCUMENTS 26364  2/1984  Japan ............................. 280/91
48402  2/1984  Japan ............................. 280/91

OTHER PUBLICATIONS

J. E. Shingley, *Mechanical Engineering Design*, McGraw Hill Book Co., N.Y., 1963.
D. W. Dudley, *Gear Handbook*, McGraw Hill Book Co., N.Y., 1962.

*Primary Examiner*—John J. Love
*Assistant Examiner*—Karin L. Ferriter
*Attorney, Agent, or Firm*—Lyon & Lyon

[57] ABSTRACT

Disclosed is an actuator for steering the rear wheels in front and rear wheel steering device for vehicle in which the external forces, such as the self aligning torque of the rear wheels and irregularities of the road surface, which may be applied to the rear wheels are prevented from being transmitted to the actuator for controlling the steering angle of the rear wheels. Thereby, the steering angle of the rear wheels are determined solely by the control action of the front and rear wheel steering device and the motion of the vehicle is not affected by external forces. As a result, the vehicle motion is stabilized. When the force for steering the front wheels is transmitted to the rear wheels to steer them, elimination of the reaction from the road to the actuator prevents undesirable variation in the force required to steer the vehicle or the force required to hold a steering angle. Elimination of reaction to the actuator can be accomplished by worm gears, screw threads and so on in which the lead angle is smaller than the friction angle.

3 Claims, 5 Drawing Sheets

ACTUATOR FOR STEERING THE REAR WHEELS IN FRONT AND REAR WHEEL STEERING DEVICE FOR VEHICLE

FIELD OF THE INVENTION

This invention relates to an actuator for controlling a steering angle or a steering angle ratio of rear wheels relative to front wheels in a front and rear wheel steering device for a vehicle which variably controls the steering angle of the rear wheels according to certain conditions.

DESCRIPTION OF THE PRIOR ART

There have been a number of proposals to provide front and rear wheel steering devices particularly in the form of four wheel steering devices. For instance, Japanese Patent Application No. 53-163678 (Japanese Patent Laying-Open Publication No. 55-91457), filed by the Assignee of the present application, proposes a front and rear wheel steering device for a vehicle which steers the rear wheels in relation with the steering of the front wheels in the same phase relationship in high speed range and in the opposite phase relationship in low speed range. The steering angle ratio may be a continuous function relative to the vehicle speed. In this conjunction, the object of the control may be either the steering angle ratio of the rear wheels relative to the front wheels or the steering angle of the rear wheels itself.

Thus, a continuous control of the steering angle or the steering angle ratio of the rear wheels is performed according to this continuous function so that the function of the steering device may be favorable in both high speed and low speed ranges. Specifically, the minimum angle of turning and the inner radius difference of the vehicle are both drastically reduced and the maneuverability of the vehicle, particularly in low speed range, in driving the vehicle into a garage, driving the car through narrow and crooked alleys and making a U-turn are substantially improved with the additional advantage of improving the dynamic lateral response of the vehicle in high speed range.

Generally speaking, in a front wheel steering device, the reaction which the front wheels receive from the road surface is allowed to be transmitted to the steering wheel so that the driving of the vehicle may be facilitated by obtaining a force which tends to return the front wheels to their straight positions from the caster angle given to the front wheels. However, as for the rear wheels, such action is not only unnecessary but may cause the inconvenience that the motion of the vehicle may be affected by interferences such as the irregularities of the road surface when the rear wheels are steered.

SUMMARY OF THE INVENTION

In view of such inconveniences of the prior art, a primary object of this invention is to provide an actuator for controlling the steering angle ratio of the rear wheels in a front and rear wheel steering device according to which the steering angle ratio of the rear wheels is not affected even when the rear wheels are subjected to external force and stable running is always assured.

Another object of this invention is to provide an actuator for steering the rear wheels in a front and rear wheel steering device according to which the rear wheels are not steered even when an external force is applied to the rear wheels and stable running is always assured.

According to this invention, such an object is accomplished by providing an actuator for controlling a steering angle of rear wheels relative to front wheels in a front and rear wheel steering device for a vehicle which variable controls the steering angle of the rear wheels according to certain conditions, characterized in that: external force applied to the rear wheels is prevented from being transmitted to the input end of the actuator.

According to a certain aspect of the present invention, the actuator drives a device for determining the steering angle ratio of the rear wheels relative to the front wheels.

Thus, by preventing the transmission of external force applied to the rear wheels to the input end of the actuator for controlling the steering angle ratio of the rear wheels, the steering angle ratio of the rear wheels is always fixed to a certain value determined by the state of the actuator and the steering angle ratio of the rear wheels is not affected by the external force applied thereto.

According to another aspect of the present invention, the actuator steers the rear wheels.

Thus, by preventing the transmission of external force applied to the rear wheels to the input end of the actuator for steering the rear wheels, the rear wheels are always fixed to the positions determined by the state of the actuator and the rear wheels are not steered by the external force applied thereto.

BRIEF DESCRIPTION OF THE DRAWINGS

Such and other objects and advantages of the present invention will be better understood with reference to the following description and the appended drawings in which.

DETAILED DESCRIPTION OF THE PREFERRED EMBODIMENTS

Now embodiments of the invention are described in the following with reference to the appended drawings.

Figure 1:
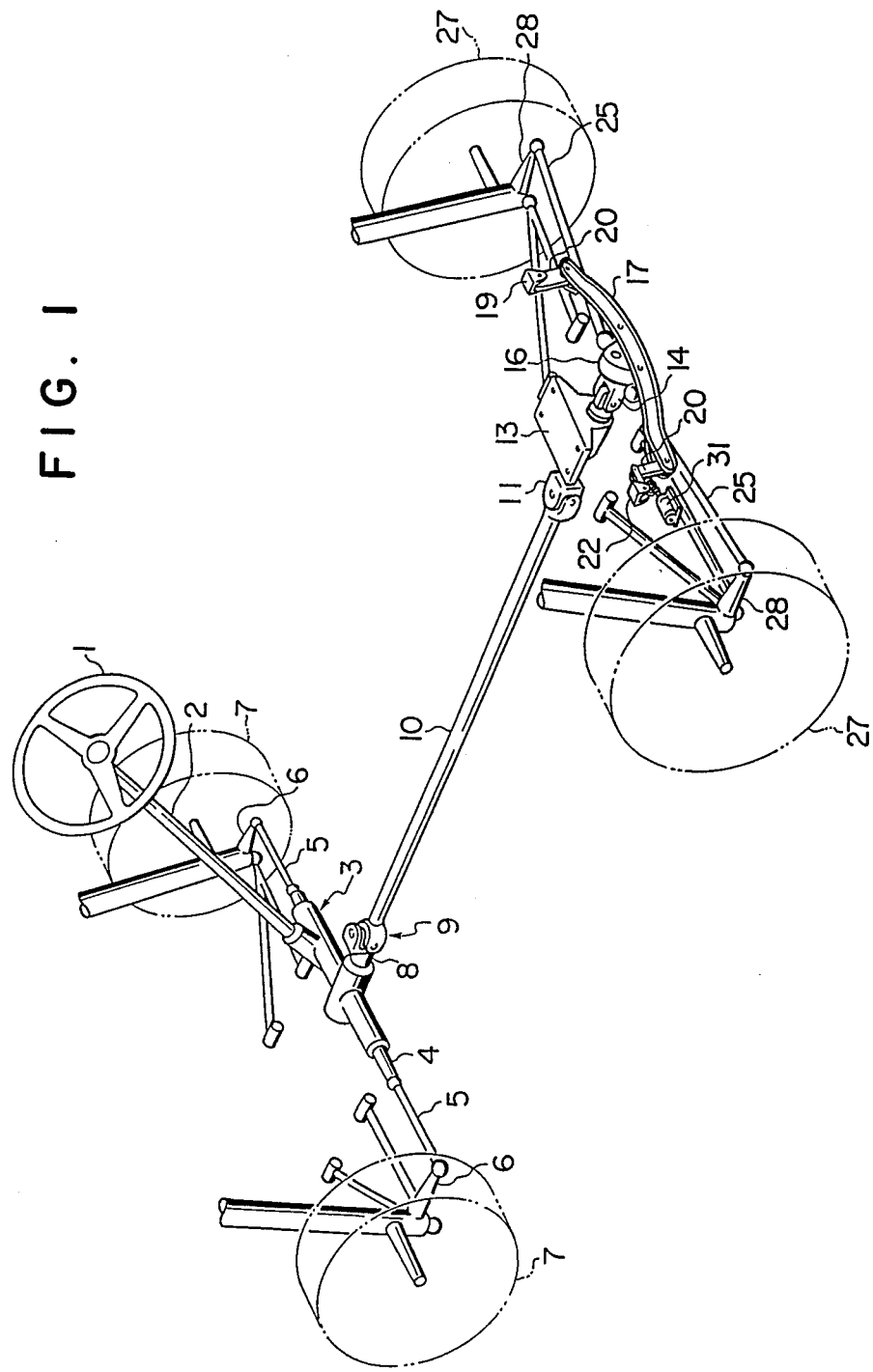
FIG. 1 is a perspective view showing the general basic structure of a vehicle provided with an actuator for a front and rear wheel steering device according to this invention with the chassis of the vehicle removed.

As shown in FIG. 1, a steering column shaft 2 of a steering wheel 1 is joined into a rack and pinion type gear box 3, and a pair of tie rods 5 are connected to the two ends of a rack shaft 4 which meshes with a pinion gear (not shown in the drawings) integrally attached to the lower end of the steering column shaft 2. To the external ends of the tie rods 5 are connected a pair of knuckle arms 6 which support right and left front wheels 7, respectively, in such a manner that the front wheels 7 can be steered to the direction determined by the steering wheel 1 in the known manner.

A pinion shaft 8 extends from the gear box 3 in to the rearward direction and an elongated linkage shaft 10 is connected to the rear end of the pinion shaft 8 by way of a universal joint 9. The pinion shaft 8 is provided with a pinion gear (which is not shown in the drawings) which meshes with the rack shaft 4. And an input shaft 12 (FIG. 2) is connected to the rear end of the linkage shaft 10 by way of another universal joint 11. This input shaft 12 is disposed along the laterally central line of the rear part of the vehicle and is rotatably supported by a bearing bracket 13 as best shown in FIG. 2.

Figure 2:
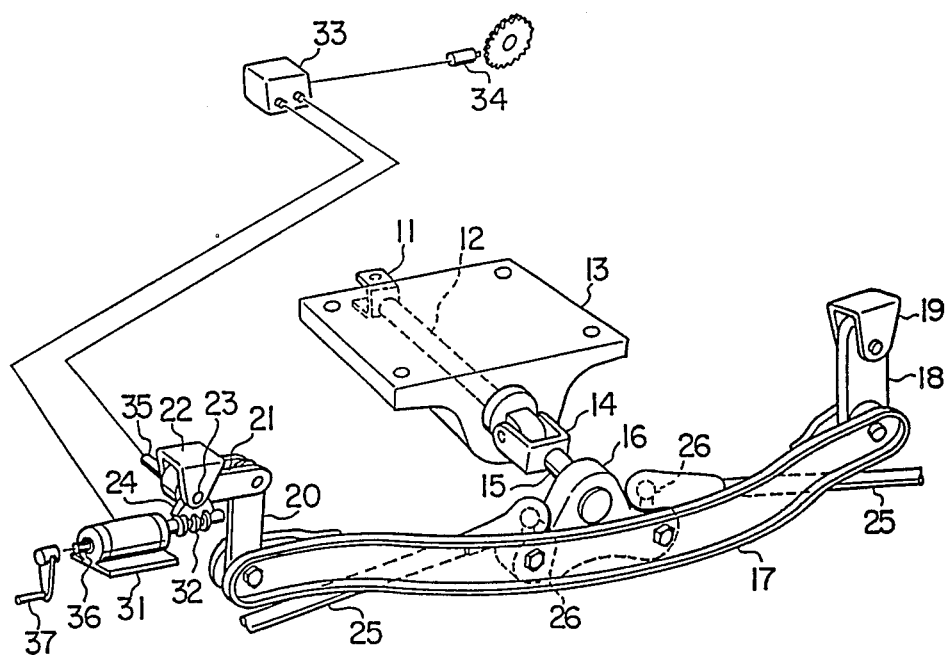
FIG. 2 is a magnified perspective view of a rear wheel steering system of the embodiment of FIG. 1.

Further, a swing shaft 15, which is described in greater detail in FIG. 2, is connected to the rear end of the input shaft 12 by way of a clevis 14, and a joint member 16 is loosely fitted over a middle portion of the swing shaft 15. The two lateral ends of the joint member 16 are connected to tie rods 25 by way of ball joints 26 respectively, and the joint member 16 is fixedly supported by a middle part of an arm member 17 which is arranged along the widthwise direction of the vehicle.

One end of the arm member 17 is connected to the vehicle body by way of a link member 18 and a link bracket 19 while the other end of the arm member 17 is connected to the vehicle body by way of link members 20 and 21 and a link bracket 22 in such a manner that the arm member 17 may be able to swing in a vertical plane which is perpendicular to the longitudinal direction of the vehicle. A pivot shaft 23 of the link member 21 on the side of the bracket 22 can rotate integrally with the link member 21. The external ends of the tie rods 25 are connected to knuckle arms 28 which support rear wheels 27 as shown in FIG. 1.

A motor 31 is mounted in a part of the vehicle body located on the side of the other end of the arm member 17 and an output shaft of the motor 31 is fixedly provided with a worm 32 which in turn meshes with a sector gear 24 integrally mounted to the pivot shaft 23 of the link member 21. Thus, the rotation of the motor 31 will cause the rotational motion of the arm member 17.

According to this embodiment, since the lead angle of the worm 32 is selected to be smaller than the friction angle thereof, external force applied to the rear wheels will not drive the worm 32 by way of the sector gear 24 and the steering angle ratio of the rear wheels will not be affected by external factors such as the irregularities of the road surface. Furthermore, so that the steering angle ratio may be restored, for instance manually, to a neutral position even when the steering angle ratio is fixed to a certain value for instance due to a failure of the motor 31 for any reason, a hexagonal cross-section portion 36 is provided at an end of the output shaft of the motor 31 and the steering angle ratio of the rear wheels may be fixed to zero by engaging a separately stowed crank handle 37 with the hexagonal portion 36 and manually turning the output shaft of the motor 31.

As other actuators for controlling the steering angle ratio of the rear wheels according to which the the steering angle ratio will not be interfered by external force acting on the rear wheels, there are screw and other per se known mechanisms.

When the force for steering the front wheels is transmitted to the rear wheels to steer them as is the case in this embodiment, elimination of the reaction from the road to the actuator prevents undesirable variation in the force required to steer the vehicle or the force required to hold a steering angle.

Further, the vehicle is provided with a computer 33 which receives signals from a vehicle speed sensor 34 for detecting the vehicle speed and a position sensor 35 which detects the position of the pivot shaft 23 of the link member 21 and sends an appropriate control signal to the computer 33 according to the vehicle speed to control the rotation of the motor 31.

Figure 3A:
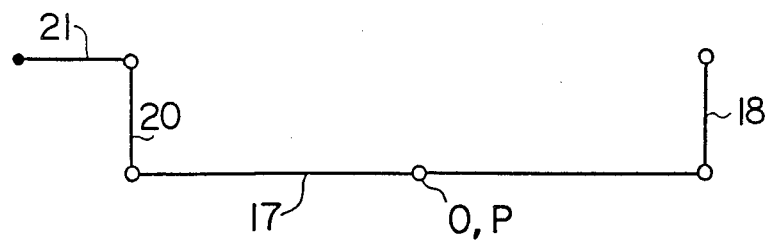
FIG. 3 (a), (b) and (c) are skeleton diagrams of the rear wheel steering system of FIG. 2, illustrating the working principle thereof.
Figure 3B:
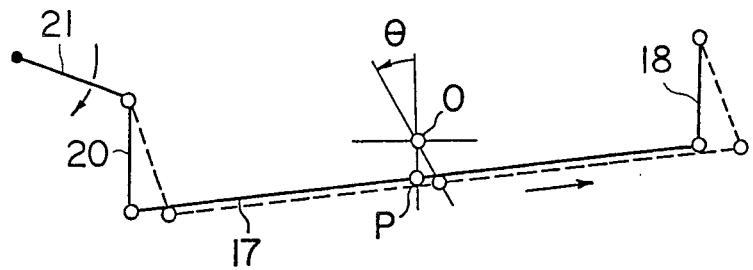
Figure 3C:
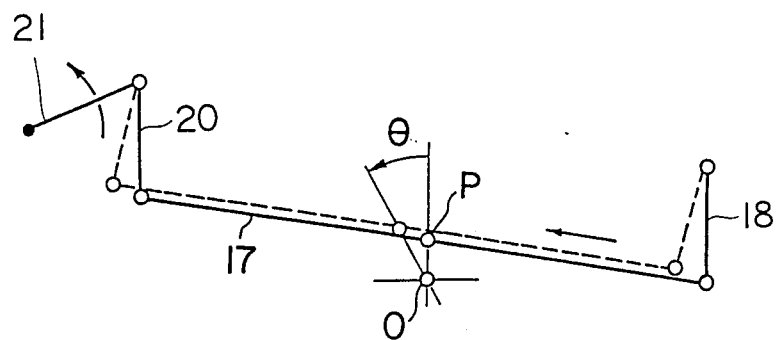

When the pivot point P of the joint member 16 coincides with the center O of the input shaft 12 as shown in FIG. 3 (a), the input shaft 12 and the swing shaft 15 rotate in a coaxial manner, and therefore the joint member 16 will not laterally swing and the tie rods 25 remain stationary so that only the front wheels 7 are steered and the rear wheels 27 are not steered at all, in the same manner as in a conventional vehicle.

When the link member 21 is downwardly rotated by the rotation of the motor 31 by way of the worm 32 and the sector gear 24 meshing therewith, the arm member 17 inclines with its left end down as shown in FIG. 3 (b). Due to this inclination of the arm member 17, the pivot point P is located below the axial center O and, if the input shaft 12 is rotated for instance in counter-clockwise direction by angle theta, the tie rods 25 move rightwardly as indicated by broken lines in FIG. 3 (b), to steer the rear wheels 27 in the direction opposite to the steering direction of the front wheels 7.

When the link member 21 is upwardly rotated by reverse rotation of the motor 31, the arm member 17 inclines with its left end up as shown in FIG. 3 (c). Due to this inclination of the arm member 17, the pivot point P is located above the axial center O and, if the input shaft 12 is rotated for instance likewise in counter-clockwise direction by angle theta, the tie rods 25 move leftward, as opposed to the previous case, as indicated by broken lines in FIG. 3 (c), to steer the rear wheels 27 in the same direction as the front wheels 7.

Now the control action of the above-described embodiment will be described in the following with reference to FIGS. 4 and 5.

Figure 4:
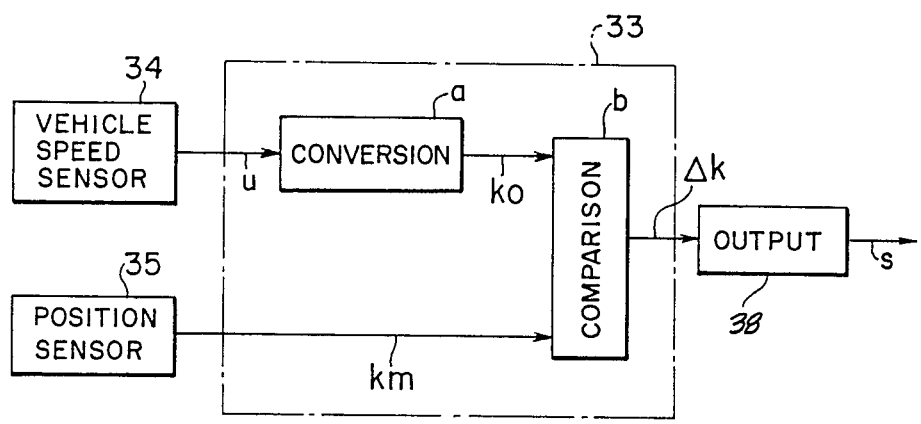
FIG. 4 is a block diagram of the control structure of the embodiment of FIGS. 1 to 3.
Figure 5:
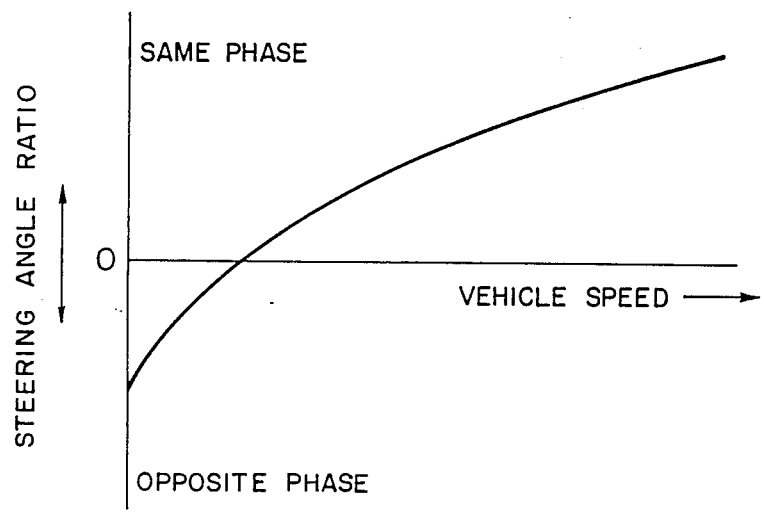
FIG. 5 is a graph showing the steering angle characteristics of the embodiment of FIGS. 1 to 4.

FIG. 4 shows the functional structure of the computer 33. The vehicle speed signal detected by the vehicle speed sensor 34 is supplied to the computer 33 as a certain vehicle speed signal u. This vehicle speed signal u is converted into a predetermined steering angle ratio signal $k_0$ (=f(u)) by a conversion process (a).

The position sensor 35 detects the rotational position of the link member 21 which is proportional to the steering angle ratio in actual steering and the detected result is supplied to the computer 33 as an actual steering angle ratio $k_m$. A relative difference delta $k = k_m - k_0$ is obtained by a comparison process (b) from the actual steering angle ratio data $k_m$ and the predetermined steering angle ratio data $k_0$. This difference delta k is supplied from the computer 33 to an output control device 38 as data corresponding to the correction of the steering angle ratio which is required to obtain the desired steering angle ratio. The output end of the output control device 43 is connected to the motor 31 and supplies thereto a control signal s corresponding to the difference delta k. Thus, the motor 31 is rotated in the direction which accomplishes the steering angle ratio according to the functional relationship shown in FIG. 5.

In the above-described embodiment, the various processes conducted in the computer 33 are executed by a certain program (software) stored for instance in a storage area of the computer 33, but it is possible to utilize electric circuitry having a similar functionality to perform the same processes.

Thus, according to this embodiment, since external force which the rear wheels receive from the road surface is not transmitted to the input end of the actuator for controlling the steering angle ratio of the rear wheels, the motion of the vehicle is not undesirably affected by the external force which otherwise would affect the steering angle ratio of the rear wheels, and the stable running of the vehicle is always assured.

Figure 6:
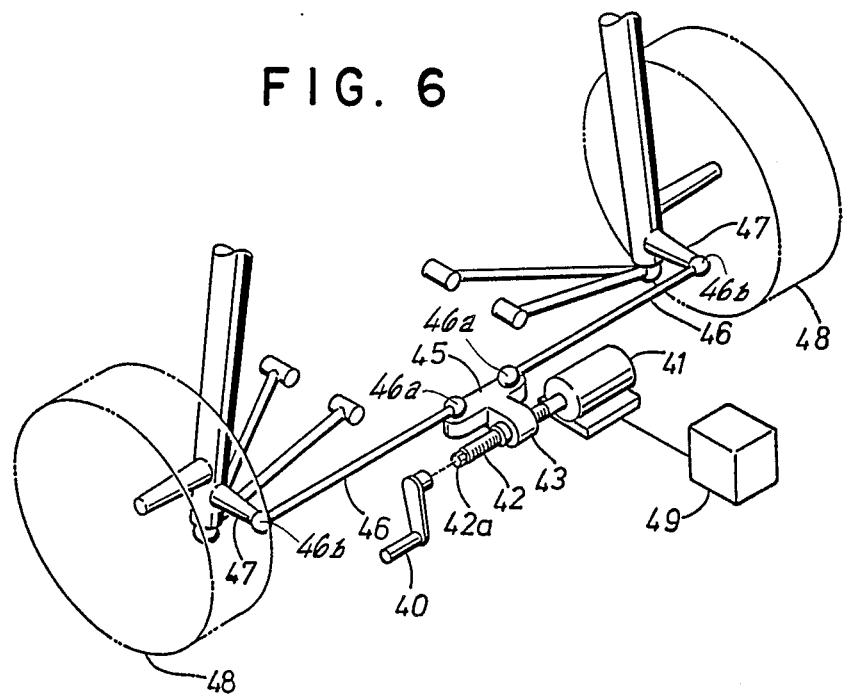
FIG. 6 is a simplified perspective view showing a rear wheel steering device to which another embodiment of the actuator for steering the rear wheels according to this invention is applied.

FIG. 6 shows a second embodiment of the actuator for steering the rear wheels according to this invention. An electric motor 41 is fixedly secured to a portion of a vehicle body adjacent to a central position of a rear part of the vehicle, and a screw rod 42 is fixedly and coaxially secured to the output shaft of the motor 41. The screw rod 42 is threadingly engaged with an internal screw thread formed in a projection 43 of a slider 45. The slider 45 is supported by the vehicle body so as to be slidable along the lateral direction and is connected to internal ends of tie rods 46 by way of ball joints 46a. The other ends or the external ends of the tie rods 46 are connected to knuckle arms 47 of rear wheels 48 likewise by way of ball joints 46b. A portion 42a of hexagonal cross-section is formed at the free end of the screw rod 42.

Here, the lead angle of the thread of the screw rod 42 is selected to be smaller than the friction angle thereof and the rear wheels 48 may be steered by driving the slider 45 through the rotation of the screw rod 42 but the screw rod 42 would not be driven by an external force applied to the rear wheels 48.

The motor 41 is connected to a computer 49 carried by the vehicle and is driven so as to achieve a desired steering angle in the rear wheels 48 according to a certain control program. When the motor 41 is rotatively driven, the slider 45 moves laterally by way of the screw mechanism and the rear wheels 48 can be steered.

If the action of the motor 41 is impossible for any reason and the rear wheels 48 have become stationary with a certain steering angle, it may become difficult to drive the vehicle. Therefore, in such a case, a crank handle 40 may be engaged with the hexagonal portion 42a and the screw rod 42 may be turned in the necessary direction to restore and fix the rear wheels 48 to their neutral positions.

Figure 7:
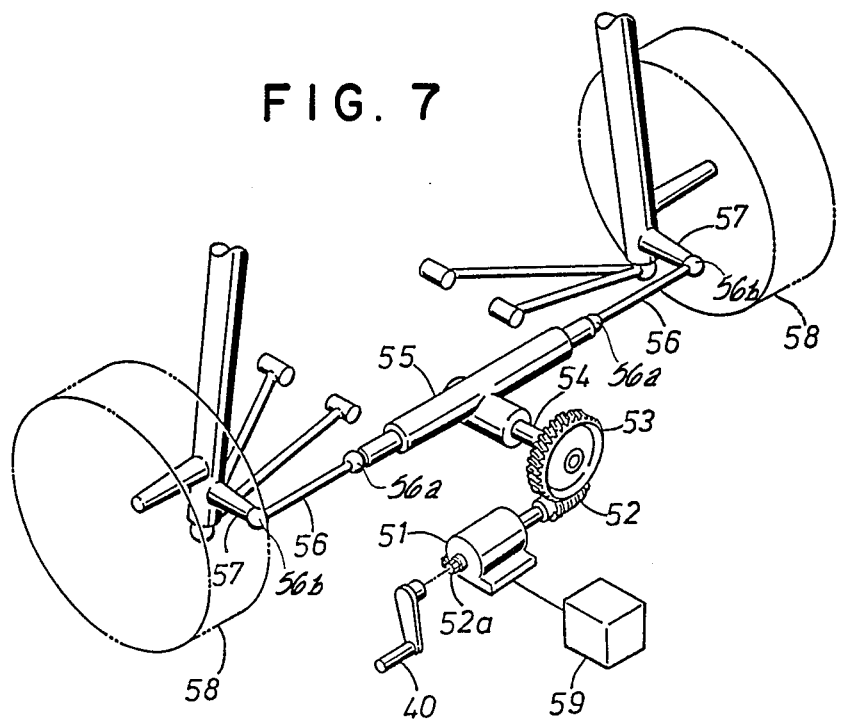
FIG. 7 is a general simplified perspective view of a rear wheel steering device to which a third embodiment of the actuator for steering the rear wheels according to this invention is applied.

FIG. 7 shows a third embodiment of the actuator for steering the rear wheels according to this invention. The output shaft of a motor 51 is provided with a worm 52 which in turn meshes with a worm wheel 53 mounted to a pinion shaft 54 of a rack and pinion gear device 55. The two ends of a rack shaft of the rack and pinion gear device 55 are connected to internal ends of tie rods 56, respectively, by way of ball joints 56a and the other ends of the tie rods 56 are connected to knuckle arms 57 of the rear wheels 58, respectively, likewise by way of ball joints 56b.

The motor 51 is connected to a computer 59 carried by the vehicle and is rotatively driven so as to achieve a desired steering angle of rear wheels 58 according to a predetermined control program. When the motor 51 is rotatively driven, the rear wheels 58 are steered by the motor 51 by way of the rack and pinion gear device 55 and the tie rods 56.

In this embodiment also, the angle of the worm 52 is selected to be smaller than the friction angle thereof so that the rear wheels 58 will not be steered by the external force applied thereto by driving the motor 51. In view of the case in which the motor 51 becomes stationary for a failure thereof while the rear wheels 58 are steered in either direction, a portion 52a with hexagonal cross-section is provided at an end of the output shaft of the motor 51 so that the rear wheels 58 may be manually restored to their neutral positions by engaging a separately stored crank handle 40 with the hexagonal portion 52a and manually turning the output shaft of the motor 51 to restore the rear wheels 58 to their neutral positions.

Thus, according to these embodiments, since external force which the rear wheels receive from the road surface is not transmitted to the input end of the actuator for steering the rear wheels, the motion of the vehicle is not interfered by the external force which otherwise would steer the rear wheels, and the stable running of the vehicle is always assured.

Although the present invention has been shown and described with reference to the preferred embodiments thereof, it should not be considered as limited thereby. Various possible modifications and alterations could be conceived of by one skilled in the art to any particular embodiment, without departing from the scope of the invention.

We claim:

1. An actuator for controlling a steering angle of rear wheels relative to front wheels in a front and rear wheel steering device for a vehicle which variably controls the steering angle of the rear wheels according to certain conditions, comprising:

drive means, drive force transmitting means for transmitting the drive force of the drive means to tie rods of the rear wheels for directly steering the rear wheels with the drive force, and control means for controlling the motion of the drive means in such a manner that the rear wheels are steered according to the certain conditions, the drive force transmitting means comprising a mechanical element which transmits the drive force of the drive means to the rear wheels but frictionally prevents any external force acting on the rear wheels from being transmitted to the drive means.

2. An actuator as defined in claim 3, wherein the drive means is a rotary motor, and the mechanical element comprises a worm fixedly attached to an output shaft of the rotary motor, a steering gear device having an output end connected to the tie rods of the rear wheels and a worm gear which is fixedly attached to an input end of the steering gear device, the lead angle of the worm being smaller than the friction angle thereof.

3. An actuator as defined in claim 1, wherein the drive means is a rotary motor, and the mechanical element comprises a screw rod fixedly and coaxially attached to an output shaft of the rotary motor and a slider which has an internal screw thread engaged to the screw rod and operatively connected to the tie rods for the rear wheels, the lead angle of the screw threads being smaller than the friction angle thereof.

* * * * *